(12) United States Patent
Horiuchi et al.

(10) Patent No.: US 6,598,999 B2
(45) Date of Patent: Jul. 29, 2003

(54) INDICATOR SYSTEM AND COMBINED LENS FOR USE THEREWITH

(75) Inventors: Mitsuo Horiuchi, Sagamihara (JP); Fusanobu Nakamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/952,439

(22) Filed: Sep. 14, 2001

(65) Prior Publication Data

US 2002/0085381 A1 Jul. 4, 2002

(30) Foreign Application Priority Data

Sep. 14, 2000 (JP) .......................................... 2000-279998

(51) Int. Cl.[7] ................................................ F21V 5/04
(52) U.S. Cl. ........................ 362/335; 362/800; 362/307
(58) Field of Search ................................. 362/326, 327, 362/329, 330, 331, 332, 333, 335, 336, 338, 32, 249, 307, 800; 359/409

(56) References Cited

U.S. PATENT DOCUMENTS

| RE34,254 | E | * | 5/1993 | Dragoon | 362/307 |
| 5,349,504 | A | * | 9/1994 | Simms et al. | 362/32 |
| 5,754,726 | A | * | 5/1998 | Peterson et al. | 385/147 |
| 5,810,468 | A | * | 9/1998 | Shimada | 362/146 |

* cited by examiner

*Primary Examiner*—Thomas M. Sember
*Assistant Examiner*—John Amarantides
(74) *Attorney, Agent, or Firm*—Martin J. McKinley

(57) ABSTRACT

A combined lens includes a first luminescence surface, a second luminescence surface, a first concave surface for reducing surface reflection of light from the light source and for conducting the light to the first luminescence surface, and a second concave surface 26 for reducing surface reflection of the light from the light source and for conducting the light to the second luminescence surface. This allows the same status display to be provided in a plurality of directions by one light source.

2 Claims, 5 Drawing Sheets

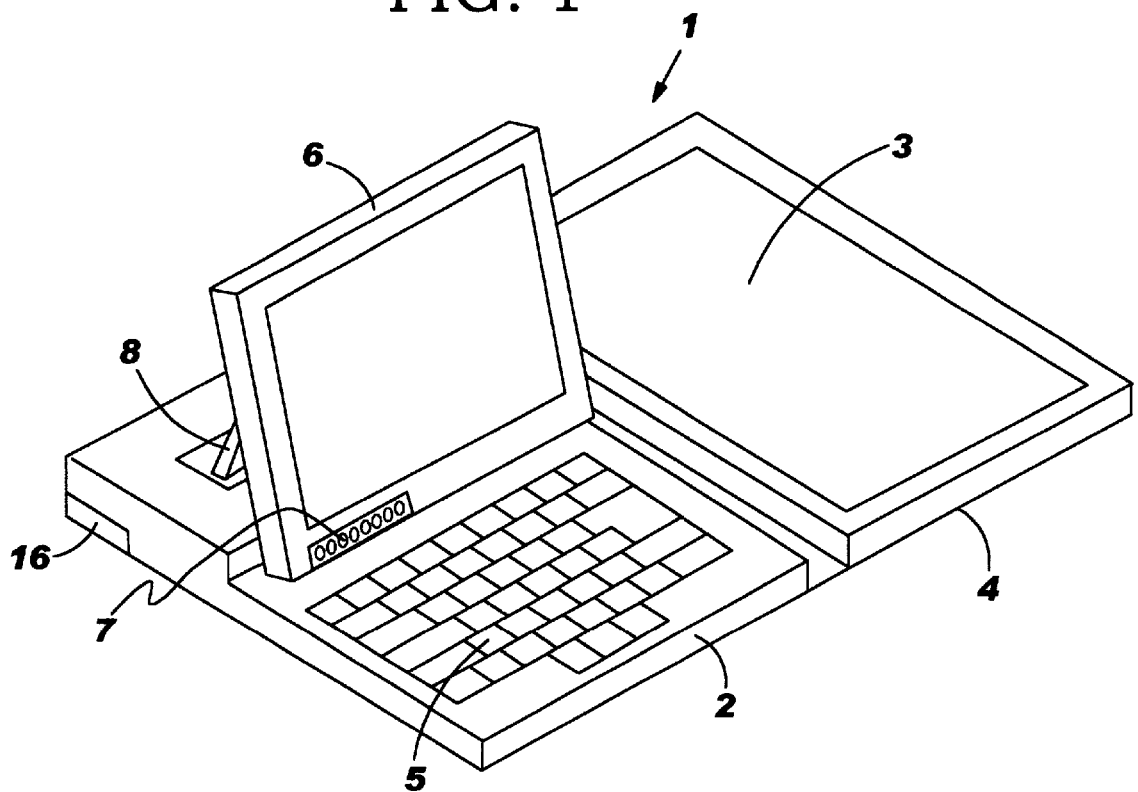
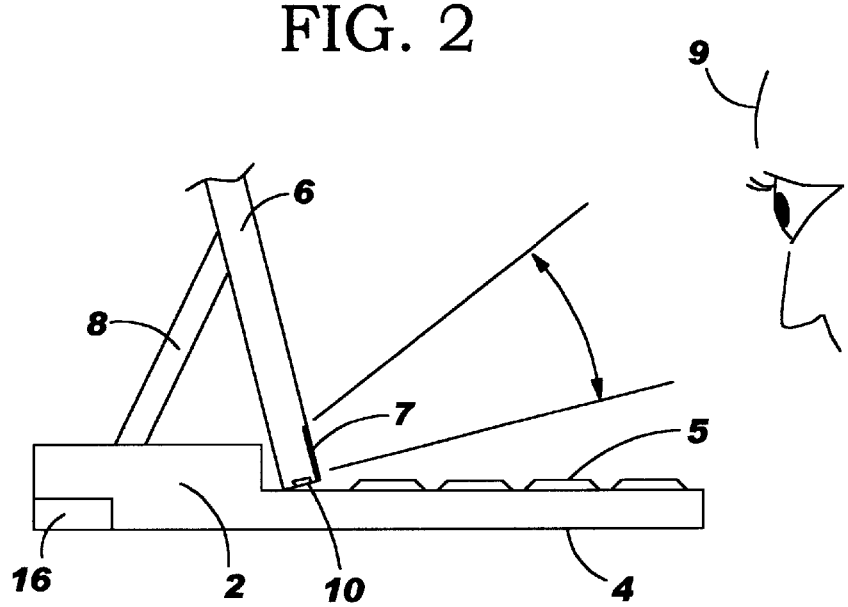

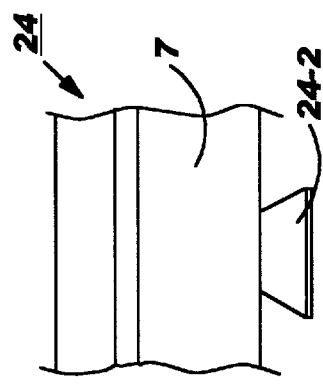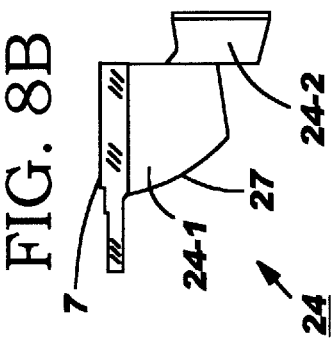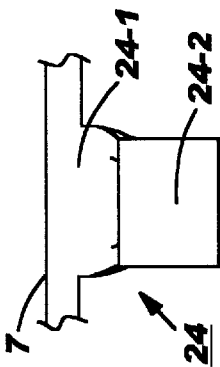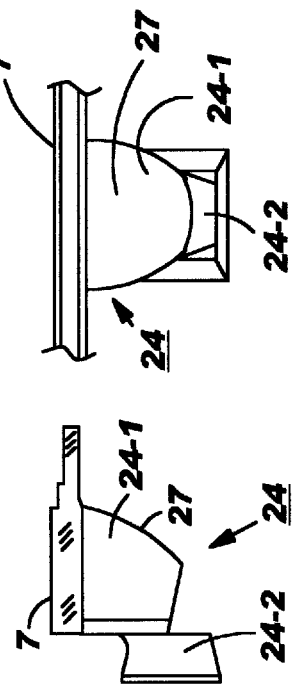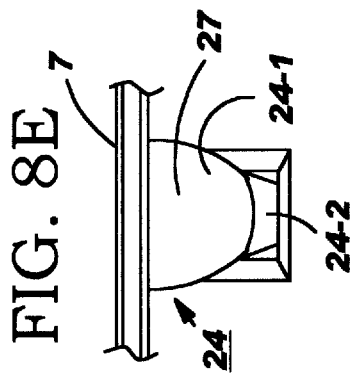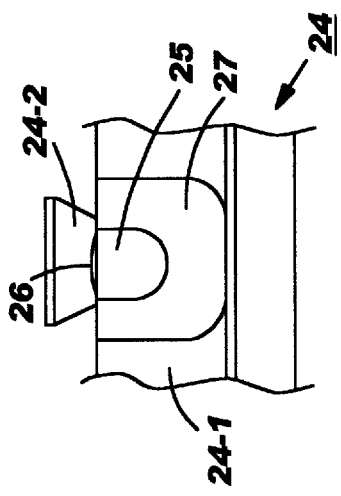

INDICATOR SYSTEM AND COMBINED LENS FOR USE THEREWITH

BACKGROUND OF THE INVENTION

The present invention pertains to an indicator system employing a combined lens that emits light in multiple directions. The indicator system may be used to display the status of electronic equipment, such as a personal computer (PC).

Conventionally, in electronic equipment such as notebook PC's, status display has been provided by causing an indicator to illuminate, or displaying icons so that the user can check the power status, electronic equipment status, etc. For the status display in the notebook PC, an LED is often used as the light source of the indicator because of size, cost, and ease of mounting on a board, and the LED is typically of the SMT (Surface Mount Technology) type, which is very small and has a rectangular outer shape.

In the above described conventional indicator system, two light sources are generally required to simultaneously provide the same status display at two or more locations. The use of two light sources to indicate the same status is problematic, in that it increases the number of parts, manufacturing cost and power consumption, thereby shortening the battery life in a notebook PC, personal digital assistant, or other battery operated device.

Therefore, it is the object of the present invention to overcome the disadvantages of the prior art dual light source status indicator.

SUMMARY OF THE INVENTION

The indicator system of the present invention is related to a technique for simultaneously providing the same status display at a plurality of locations, in which status display is given in the first light emission direction and second light emission direction of a single light source. This allows status display to be given in a plurality of directions with one light source, and thus the same status display can be simultaneously provided at two or more locations without increasing the number of parts, resulting in reduction of the power consumption.

As a preferred specific example of the indicator system of the present invention, a rectangular LED is used as the light source, and it is constructed so that the first light emission direction is a direction perpendicular to a principal surface of the LED, while the second light emission direction is a direction parallel with the principal surface of the LED. As such LED, a small-sized, rectangular LED of the SMT (Surface Mount Technology) type is usually used for reasons such as easiness of mounting on a board. The directivity of the light emitting section of this LED is poor as compared with another type of LED shaped in a bullet and having a condenser lens in the top end thereof and a reflecting mirror in the light emitting section thereof, and, when it illuminates, a substantial amount of light also leaks laterally of it (in the direction parallel with the principal surface) as well as from the luminescence surface (in the direction perpendicular to the principal surface). In the present invention, by using this characteristic, the status display in the second light emission direction other than the first light emission direction is provided by the laterally leaking light.

Further, as a preferred specific example of the indicator system of the present invention, status display by an icon display section is provided in a first light emission direction, and status display by a luminescence section is provided in a second light emission direction. In this case, normally the status can be checked by the icon display section, and when the cover is closed for mobile use and the status display by the icon display section in the first light emission direction cannot be identified, the status display can be identified by the luminescence section in the second light emission direction. Specifically, a preferred example in which the present invention is applied to the LCD panel of a notebook PC can be constructed so that the icon display section is arranged in the same side of the LCD panel as the LCD panel face to allow the status display by the icon display section to be visually checked when the LCD panel is opened for use, and so that the luminescence section is arranged in a side of the LCD panel that is perpendicular to the LCD panel face to allow the status display by the luminescence section to be visually checked when the LCD panel is closed for mobile use.

Further, as a specific preferred example of the indicator system of the present invention, a main lens structured to prevent surface reflection by using a concave incident surface is arranged on the first light emission direction side of a light source, and a secondary lens of a concave structure is arranged on the second light emission direction side of the light source. In this case, light in the first light emission direction can be condensed to further increase the amount of light, and light in the second light emission direction can be scattered to allow the status display to be checked from a wide range of directions. In addition, more preferably, the main lens and the secondary lens are integrally formed to enable easy handling of them, and the surface of the main lens that is in contact with the icon display section is sized the same as the surface of the icon display section to eliminate shortage of light at the edge of an icon in the icon display section.

The combined lens used in the indicator system of the present invention is constructed as follows. That is, it comprises a first luminescence surface, a second luminescence surface, a first concave surface for reducing surface reflection of the light from a light source and conducting the light to the first luminescence surface, and a second concave surface for reducing surface reflection of the light from the light source and conducting the light to the second luminescence surface. With this combined lens, the indicator system of the present invention can be accomplished in a more preferable manner.

BRIEF DESCRIPTION OF THE DRAWINGS

FIG. 1 is an illustration of a notebook PC having an indicator system of the present invention;

FIG. 2 is a side view of the notebook PC of FIG. 1 further illustrating an operator viewing the indicator system from a first direction;

FIGS. 8A–8F are six figures showing in detail one embodiment of the combined lens of the present invention.

DESCRIPTION OF THE ILLUSTRATIVE EMBODIMENTS

Figure 3:
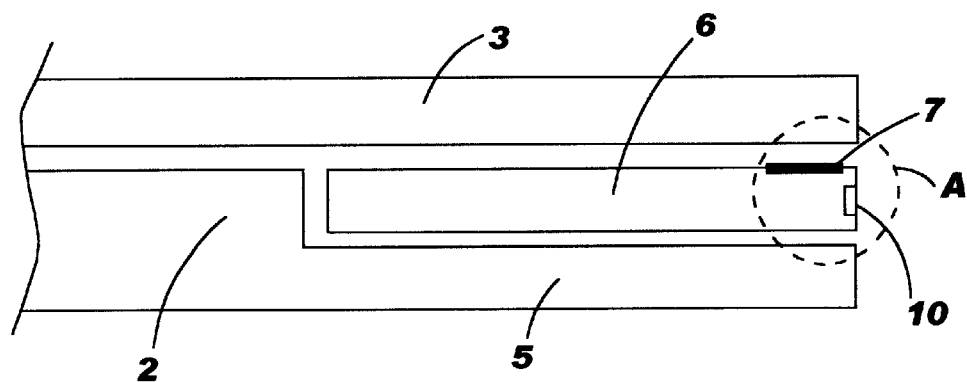
FIG. 3 is an illustration of the notebook PC of FIG. 1 in the closed position.

Now, an example of the indicator system of the present invention in a notebook PC will be described as it is mounted on the LCD panel of the notebook PC. FIG. 1 is an illustration showing the construction of an example of the notebook PC to which the indicator system of the present invention is applied. In FIG. 1, a notebook PC 1 is constructed by integrating a PC main body 2 and a digitizer 3 by a flexible cover 4. The PC main body 2 is provided with a keyboard 5 and an LCD panel 6. The notebook PC 1 can be operated with a battery 16 as a power source.

In the lower-left portion of the frame of the LCD panel 6 surface, there is provided an icon display section 7 of the indicator system of the present invention, which is using the main light emission direction of a light source. The icon display section 7 can be visually checked by an operator 9 as the LCD panel 6 is opened at a certain angle, as shown in FIG. 2. The display contents in the icon display section 7 is the same as the conventional example—for instance, the battery status, or the suspend/resume status of a PC.

When the notebook PC 1 is folded and carried at the end of the use under the conditions shown in FIGS. 1 and 2, the LCD panel 6 is stored in a manner different from the LCD panel of the conventional notebook PC. That is, by using a hinge 8 attached between the rear side of the LCD panel 6 and the PC main body 2, the LCD panel 6 is stored on the keyboard 5 with the display portion of the LCD panel 6 facing up, and the digitizer 3 is overlaid thereupon for closing. The notebook PC 1 as closed is shown in FIG. 3. As a result, as shown in FIG. 3, when the notebook PC 1 is closed for mobile use, the icon display section 7 is covered by the digitizer 3, so the status in the icon display section cannot be identified.

Thus, in the indicator system of the present invention, in addition to the icon display section 7, a luminescence section 10 employing the secondary light emission direction of the light source is provided in the end face of the LCD panel 6 that makes an angle of 90° with the icon display section 7 and is not covered by the digitizer 3. And, it is constructed so that, even if the notebook PC 1 is closed, information required to identify the status of the notebook PC 1, for instance, the battery status or the suspend/resume status of the notebook PC 1, can be checked at the luminance section 10. With such construction of the present invention, the user can carry out a proper operation, and a system which operates during suspend mode (for instance, a function for detecting a wake-up operation) can be prevented from unnecessarily consuming the battery power.

Figure 4:
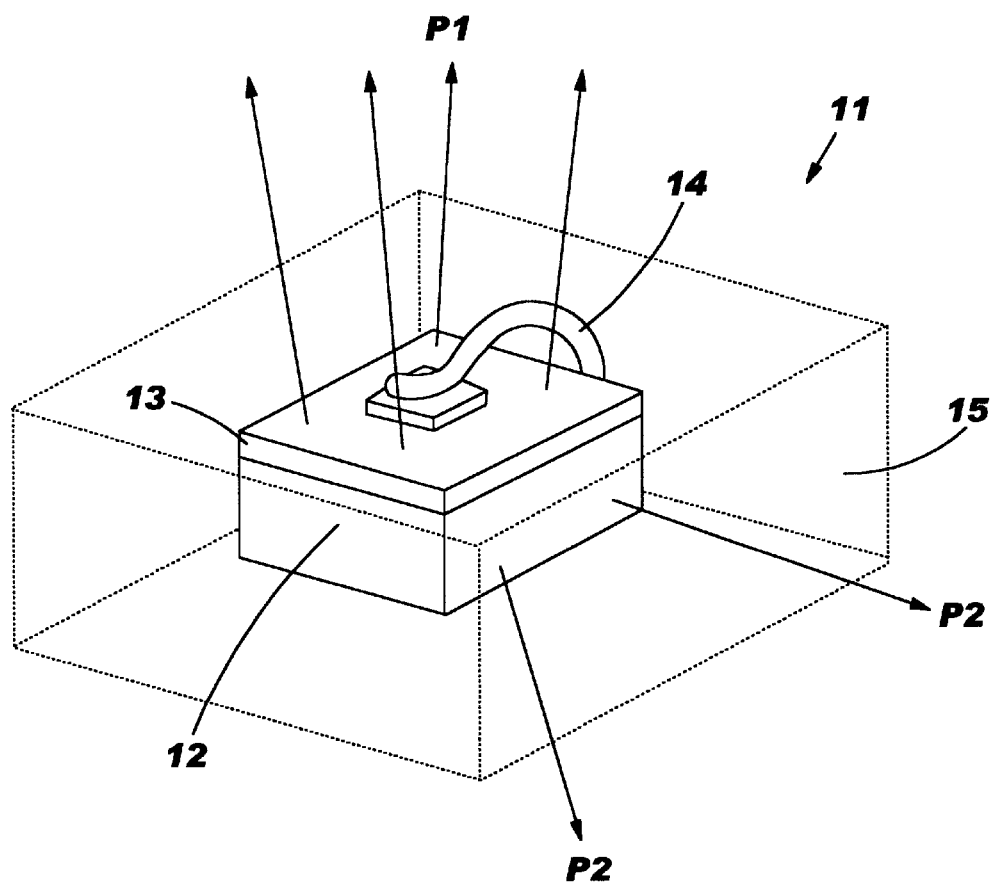
FIG. 4 is an illustration showing the construction of an SMT-type LED used in the present invention.
Figure 5:
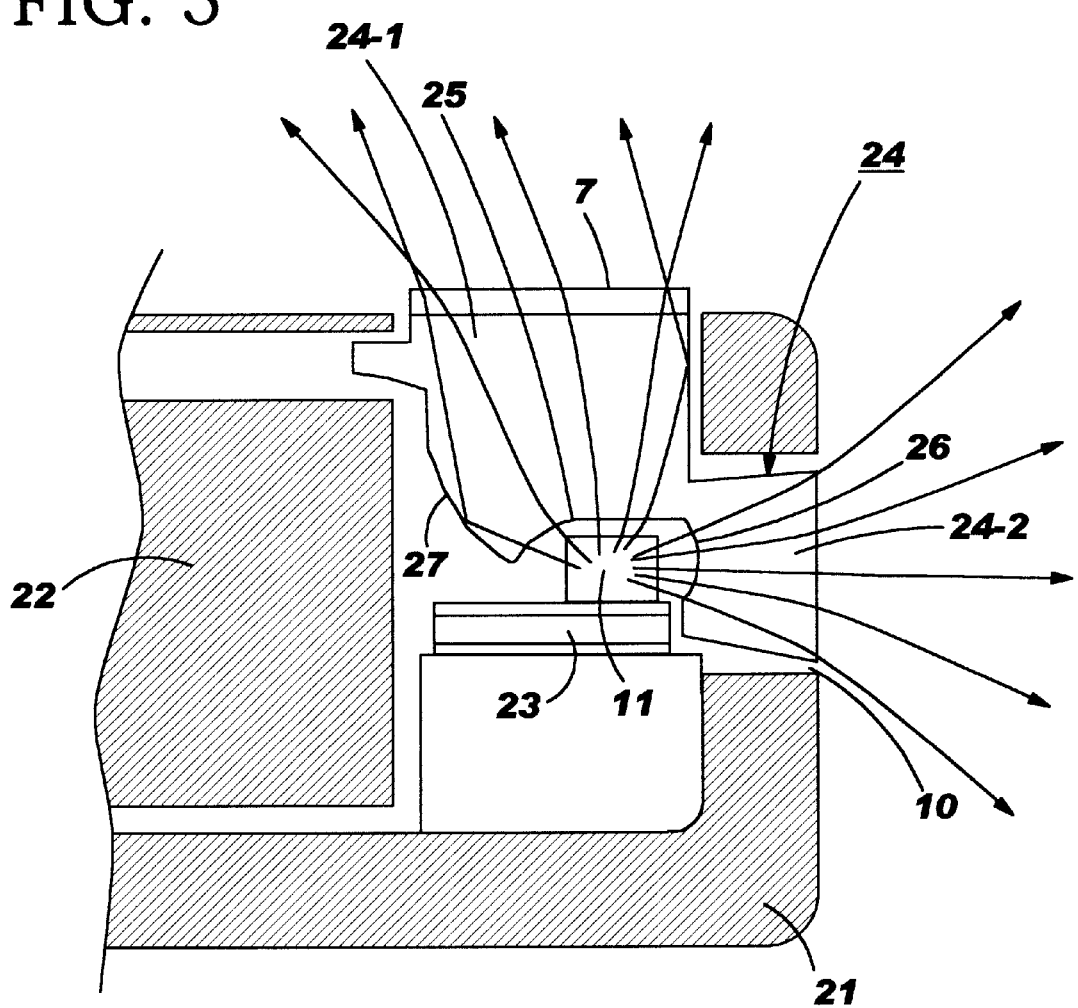
FIG. 5 is an illustration showing the construction of an end portion of an LED panel of the present invention.
Figure 6:
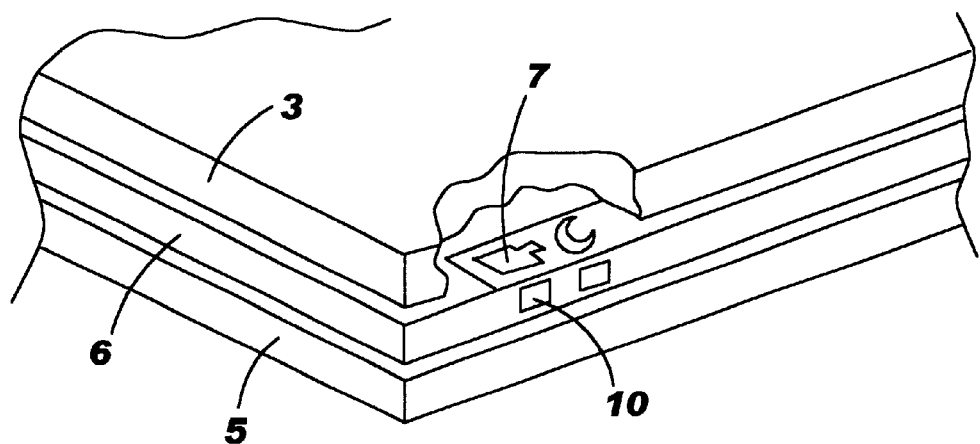
FIG. 6 is an illustration showing various states of an icon display section and a luminescence section of the present invention.

Next, the constructions of the icon display section 7 and the luminescence section 10 in the indicator system of the present invention will be described using FIGS. 4 to 6. FIG. 4 is an illustration showing the construction of an example of the SMT-type LED used in this embodiment. In an example shown in FIG. 4, an LED 11 is constructed by connecting an N-layer 12 and a P-layer 13, connecting an electrode 14 to each of N-layer 12 and the P-layer 13 (the electrode to the N-layer 12 is not shown), and storing them in a rectangular mold 15.

Since the LED 11 of this construction can be made small, it is usually used with the indicator system of a notebook PC. However, the LED 11 having such a construction is characterized in that the directivity of its light-emitting section is poor as compared with another type of LED, shaped in a bullet and having a condenser lens in the top end thereof and a reflecting mirror in the light emitting section thereof, and when it illuminates, a substantial amount of light also leaks in the lateral direction (direction P2 parallel with the principal surface) as well as from the luminescence surface (direction P1 perpendicular to the principal surface). Usually this characteristic of the LED 11 is a weak point, but, in the present invention, taking advantage of this characteristic, light in the first light emission direction P1 is used as the light source for the icon display section 7, while light in the second light emission direction P2 is used as the light source for the luminescence section 10, thereby enabling status display to be simultaneously provided in two directions by only one LED 11.

To give display on the above described icon display section 7 and luminescence section 10 by one LED 11, a combined lens having a special construction is employed in a preferred example of the present invention. FIG. 5 is an illustration showing the construction of an example of the end portion of the LCD panel in the indicator system of the present invention. In the example shown in FIG. 5, the LCD panel 6 is formed by having a display section 22, a support section 23, the LED 11, and a combined lens 24, preferably made of acrylic, in a panel main body 21.

A main lens 24-1 of the combined lens 24, which is on the icon display section 7 side, has a concave incident surface 25 so as to surround the LED 11, thereby preventing light in the first light emission direction from reflecting at the surface of the combined lens 24, and efficiently conducting the light to the icon display section 7 existing in the first light emission direction. Further, to prevent the light incident from the concave incident surface 25 in the first light emission direction from leaking in the lateral direction, there is provided a convex surface 27 (three-dimensional paraboloid) for efficiently reflecting the light incident upon the combined lens 24 to the icon display section 7, so that as much light as possible efficiently and evenly arrives at the icon display section 7. In the preferred embodiment of the present invention, the icon display section 7 existing in the first light emission direction is applied with a coating for causing irregular reflection, so that the shapes of icons in the icon display section 7 successfully illuminate and can be visually identified from all directions. Further, a secondary lens 24-2 of the combined lens 24, which is on the luminescence section 10 side, is also of the concave lens type that has a concave incident surface 26 in the second light emission direction, which is similar to the main lens, thereby widening the directivity of light in the second light emission direction of the LED 11. This allows the illumination to be recognized as easily as possible even from a substantially angled direction, for instance, when the user looks at it while carrying the notebook PC under his arms.

Thereby, even if the icon display section 7 cannot be recognized because the digitizer 3 is overlaid upon it, the status of the personal PC 1 is known by checking the luminescence section 10. Further, the portion of the combined lens 24 that is facing the LED 11 is preferably constructed to make an angle of 90° with the optical axis. Furthermore, although the main lens 24-1 on the icon display section 7 side and the secondary lens 24-2 on the luminescence section 10 side were combined to form the lens 24, they may be formed separately, of course. Moreover, the surface of the main lens 24-1 that is in contact with the icon display section 7 preferably has the same size as the surface of the icon display section 7 to prevent dropouts from occurring in icons when displayed.

Figure 7:
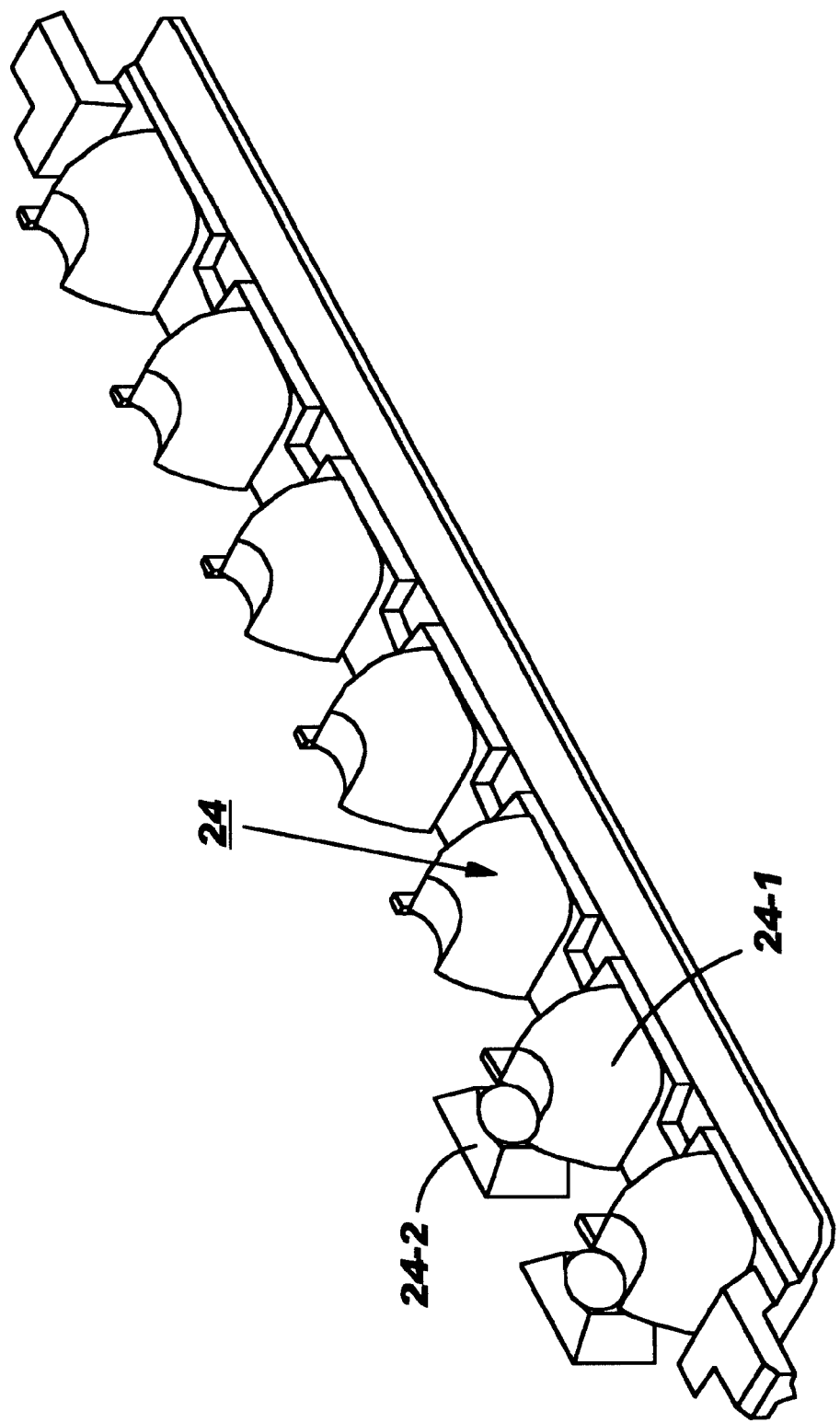
FIG. 7 is an illustration showing the construction of a combined lens of the present invention.

FIG. 7 is an illustration showing an example of integration of combined lenses 24. In the example shown in FIG. 7, the combined lenses 24 are integrally formed in a lateral line by the number of icons in the icon display section 7 (in this example, seven), and secondary lenses 24-2 are attached to the combined lenses 24 by the number of windows forming the luminescence section 10 (in this example, two). Thus, integration of the combined lenses 24 can facilitate the handling and mounting of the combined lenses 24, each of which is very small. In FIG. 8, the detailed structure of the combined lens 24 is shown by six figures. Also in the example shown in FIG. 8, the same members as the above described embodiment are assigned the same symbols.

As apparent from the above description, in accordance with the present invention, since status display is provided in a plurality of directions by using the main light emission direction and secondary light emission direction of a single light source, status display can be provided in a plurality of directions by one light source, and thus, also for simultaneously displaying the same status at two or more locations, the number of parts does not increase, hence resulting in reduction of the power consumption.

Although the present invention and its advantages have been described in detail, it should be understood that various changes, substitutions and alterations can be made herein without departing from the spirit and scope of the invention as defined by the appended claims.

What is claimed is:

1. An information handling system, comprising:

a housing having first and second sides;

a singular light source for emitting light for indicating a status of said information handling system, said light source being positioned within said housing;

a combined lens adjacent said light source, said combined lens having:

a first luminescent surface and a first concave surface for conducting light emitted from said light source to said first luminescent surface, such that light is emitted from said first luminescent surface in a first direction when said light source is activated, wherein light emitted from said first luminescent surface is visible from said first side of said housing; and;

a second luminescent surface and a second concave surface for conducting light emitted from said light source to said second luminescent surface, such that light is emitted from said second luminescent surface in a second direction when said light source is activated, wherein light emitted from said second luminescent surface is visible from said second side of said housing.

2. A combined lens for use with a singular light source, said combined lens comprising:

a first luminescent surface and a first concave surface for conducting light emitted from the light source to said first luminescent surface, such that light is emitted from said first luminescent surface in a first direction when the light source is activated; and;

a second luminescent surface and a second concave surface for conducting light emitted from the light source to said second luminescent surface, such that light is emitted from said second luminescent surface in a second direction when the light source is activated.

* * * * *